(12) United States Patent
Geiger

(10) Patent No.: US 7,980,155 B2
(45) Date of Patent: Jul. 19, 2011

(54) OPERATING ELEMENT

(75) Inventor: Michael Geiger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/486,047

(22) Filed: Jul. 14, 2006

(65) Prior Publication Data

US 2006/0248975 A1    Nov. 9, 2006

Related U.S. Application Data

(63) Continuation of application No. PCT/EP2005/002582, filed on Mar. 11, 2005.

(30) Foreign Application Priority Data

Mar. 26, 2004    (DE) .......................... 10 2004 014 888

(51) Int. Cl.
*G05G 11/00* (2006.01)
(52) U.S. Cl. ....................................................... 74/488
(58) Field of Classification Search ................ 74/551.1, 74/551.2, 551.3, 551.4, 551.5, 551.6, 551.7, 74/551.8, 551.9, 500.5, 502.2, 473.3, 486, 74/488
See application file for complete search history.

(56) References Cited

U.S. PATENT DOCUMENTS

| 3,522,745 | A | * | 8/1970 | Milosevic ........................ 74/489 |
| 3,805,003 | A | * | 4/1974 | Rennels ...................... 200/332.2 |
| 3,894,207 | A | * | 7/1975 | Jelley ............................. 200/567 |
| 4,191,866 | A | * | 3/1980 | Nakajima et al. .................. 200/4 |
| 4,552,034 | A | * | 11/1985 | Bertani et al. .................... 74/547 |
| 5,207,513 | A | | 5/1993 | Kondo et al. |
| 5,370,017 | A | * | 12/1994 | Krauer .......................... 74/502.2 |
| 5,584,213 | A | * | 12/1996 | Larson et al. ................. 74/551.9 |
| D406,041 | S | * | 2/1999 | Hsu ................................ D8/303 |
| 6,199,447 | B1 | * | 3/2001 | Lump et al. ................... 74/551.9 |
| 6,212,972 | B1 | * | 4/2001 | Yamane ....................... 74/551.9 |
| 6,244,083 | B1 | | 6/2001 | Carcarino |
| 6,708,582 | B1 | * | 3/2004 | McJunkin et al. .............. 74/488 |
| 6,718,844 | B2 | * | 4/2004 | Hanatani ...................... 74/502.2 |
| 7,176,586 | B2 | * | 2/2007 | Ledford et al. ................ 307/9.1 |

FOREIGN PATENT DOCUMENTS

| DE | 41 39 426 A1 | 6/1992 |
| DE | 195 47 408 A1 | 7/1997 |
| DE | 197 02 788 A1 | 7/1998 |
| DE | 697 05 541 T2 | 4/2002 |
| EP | 1 216 911 A2 | 6/2002 |

OTHER PUBLICATIONS

International Search report dated Jul. 13, 2005 including English Translation of relevant portion (Five (5) pages).
German Search Report dated Feb. 28, 2005 including English Translation of relevant portion (Eight (8) pages).

* cited by examiner

*Primary Examiner* — Vicky A Johnson
(74) *Attorney, Agent, or Firm* — Crowell & Moring LLP

(57) ABSTRACT

An operating element for a vehicle steerable with a handlebar, in particular a motorcycle, having an operating ring in the area of a handle of the handlebar. The operating ring can be adjusted in multiple degrees of freedom, i.e., it can be rotated, shifted and depressed. Therefore, it can be used multifunctionally for triggering various functions in the vehicle.

7 Claims, 1 Drawing Sheet

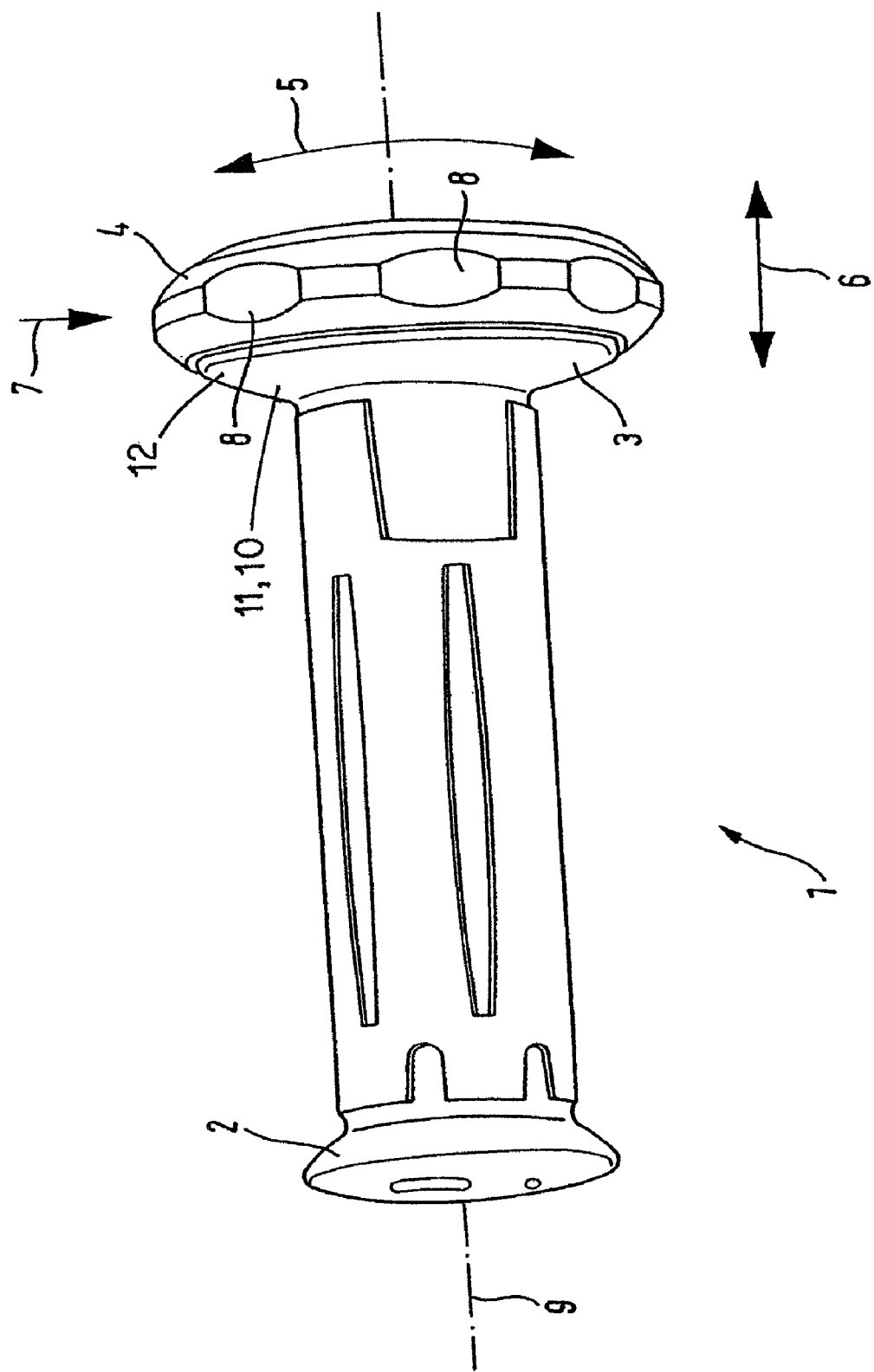

OPERATING ELEMENT

This application is a continuation of International Application No. PCT/EP2005/002582, filed Mar. 11, 2005 and claims the priority of German Patent Application No. DE 10 2004 014 888.0, filed Mar. 26, 2004, the disclosure of which is expressly incorporated by reference herein.

BACKGROUND AND SUMMARY OF THE INVENTION

The present invention relates to an operating element for a vehicle steerable with a handlebar, and in particular to a rotatable multi-function operating element.

Such an operating element for a motorcycle is disclosed in German Patent DE 197 02 788 A1. The operating element consists of a shift sleeve rotatably mounted on the handlebar in the area of the left handle. The individual gears of the motorcycle transmission can be shifted using the shift sleeve. The operator can turn the shift sleeve in both directions within a certain angular range for this purpose. The shift sleeve is not provided for triggering other vehicle functions.

To an increasing extent, such vehicles that can be steered with a handlebar, i.e., primarily motorcycles, are equipped with audio and/or hi-fi equipment or navigation equipment, etc. However, operation of these devices poses problems. The corresponding operating elements should be within the reach of the operator, so that he need not let loose of the handle to operate the device for reasons of traffic safety. On the other hand, however, there is not usually enough room for bulky operating elements in this area.

The object of the present invention is to provide an operating element with which a number of functions can be triggered.

Thus, the invention provides a rotatable operating ring that not only can be rotated about the axis of the handle but also has at least one other degree of freedom. This allows it to have a multifunctional design.

The additional degree of freedom expediently consists of a limited displacement of the operating ring in the longitudinal direction of the handle. Only one displacement direction may be provided. However, a displacement option in both directions permits a greater functional freedom.

Alternatively or in addition to the displacement option, according to an advantageous embodiment of the present invention, the operating ring may also be depressed in the radial direction. This would allow, for example, confirmation of an entry or a function that has previously been selected by rotation.

The handlebars of such vehicles frequently have covering cuffs in the area of the handles, providing a secure grip for the operator. In an expedient embodiment of the invention, the operating ring is on the covering cuff pointing toward the center of the handlebar and/or the center of the vehicle. To do so, the operating ring does not require any additional design space and is within the immediate reach of the operator. The operator can operate the ring with his thumb and optionally also his index finger without removing his hand from the handle. The operator thus has complete control of the vehicle even during the operating procedure, which ultimately serves the goal of traffic safety. In addition, this arrangement is extremely user friendly.

To further increase the user-friendly aspect, in another advantageous embodiment, the present invention provides for clearly discernible catch steps into which the operating ring can be rotated. This gives the operator definite feedback regarding the adjustment distance in the rotational operation even in gross motor operation as well as when wearing gloves, for example.

Grip depressions distributed at uniform intervals over the circumference of the operating ring also serve the purpose of increasing user friendliness.

The present invention is suitable for all vehicles steered by means of a handlebar, i.e., for two-wheeled single-track vehicles such as motorcycles as well as for vehicles with three or more wheels.

Other objects, advantages and novel features of the present invention will become apparent from the following detailed description of the invention when considered in conjunction with the accompanying drawings for example.

BRIEF DESCRIPTION OF THE DRAWING

FIG. 1 shows side view of an operating element in accordance with an embodiment of the present invention.

DETAILED DESCRIPTION

FIG. 1 shows in the single figure a left handle 1 which is pushed onto the end of a handlebar (not shown in detail here) and secured there. The handlebar is connected in a known manner to the wheel guidance elements of a vehicle wheel, usually the front wheel, and by pivoting this vehicle wheel, initiates a steering movement of the vehicle. As a rule, this is a motorcycle. The handle 1 ends with covering cuffs 2 and 3 on both ends.

On the covering cuff 3 which points toward the center of the handlebar, i.e., the center of the vehicle, there sits an operating ring 4 which can be rotated in both directions. A double arrow 5 shows the rotation options. The operating ring 4 can also be shifted back and forth in the axial direction 9 of the handle 1. This is in turn represented by another double arrow 6. Finally, the operating ring 4 can be offset and/or deformed by depressing it radially. An arrow 7 indicates this direction of movement.

The drawing does not show clearly how the adjustment of the operating ring 4 causes the adjustment of the desired functions. For this purpose, electric contacts 10, as schematically indicated in FIG. 1, may be provided in the covering cuff 3, relaying shift pulses to an electronic control unit 11 when the operating ring 4 is adjusted. The shift pulses are processed in this control unit and the respective vehicle functions are called up. For example, by rotating the operating ring 4 in the direction of the arrow 5, the volume of a radio device can be adjusted. In the case of a navigation device installed in the vehicle, on the other hand, it is possible to scroll through menu structures by rotating and/or shifting the operating ring 4 and the desired entry or setting can be confirmed by depressing in the direction of arrow 7. Instead of traditional electric contacts, the signal can also be relayed in a non-contact process. To this end, semiconductor sensors, so-called double Hall switches (in FIG. 1, hall sensors 12 schematically indicated, can be inserted into the covering cuff 3, these switches being acted upon by miniature magnets provided in the operating ring.

Grip depressions 8 are shaped in the operating ring 4, distributed over the circumference at regular intervals. By using his thumb, the operator can reliably make adjustments based on these grip depressions 8 in the operating ring 4 even when wearing gloves.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating element for a vehicle steerable with a handlebar, comprising:
    an operating ring having a first degree of freedom being rotation, mounted rotatably on the handlebar and situated in the area laterally adjacent to a handle on the handlebar,
    wherein
        the entire operating ring is configured such that the entire operating ring is displaceable relative to an adjacent hand grip on the handle of the handlebar, and when the operating ring is rotated, functions in the vehicle are triggered, and
        the operating ring has at least one additional independent degree of freedom for selecting vehicle functions, the at least one additional degree of freedom including at least one of the operating ring being displaceable in a longitudinal direction of the handle and the operating ring being displaceable in a radial direction perpendicular to the longitudinal direction.

2. The operating element as claimed in claim 1, wherein the handle includes a covering cuff, and the operating ring is rotatably mounted on the covering cuff.

3. The operating element as claimed in claim 1, wherein the operating ring is rotatable in individual catch steps.

4. The operating element as claimed in claim 1, wherein the operating ring circumference includes grip depressions.

5. The operating element as claimed in claim 1, wherein movements of the operating ring are relayed to vehicle components via electric signals.

6. The operating element as claimed in claim 5, wherein electric contacts provided in a covering cuff are acted upon by the operating ring when the operating ring is moved.

7. The operating element as claimed in claim 5, wherein Hall sensors are provided in a covering cuff to detect movement in a non-contact manner of magnets provided in the operating ring.

\* \* \* \* \*